(12) United States Patent
Kuramochi et al.

(10) Patent No.: US 10,801,629 B2
(45) Date of Patent: Oct. 13, 2020

(54) SOLENOID DEVICE

(71) Applicant: NIDEC TOSOK CORPORATION, Kanagawa (JP)

(72) Inventors: Kenta Kuramochi, Kanagawa (JP); Weiming Chen, Kanagawa (JP); Tomohiro Yasuda, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 0 days.

(21) Appl. No.: 16/442,534

(22) Filed: Jun. 16, 2019

(65) Prior Publication Data

US 2020/0003313 A1 Jan. 2, 2020

(30) Foreign Application Priority Data

Jun. 28, 2018 (JP) .................. 2018-122956

(51) Int. Cl.
*H01F 7/08* (2006.01)
*F16K 11/07* (2006.01)
(Continued)

(52) U.S. Cl.
CPC ............ *F16K 11/0712* (2013.01); *F16K 3/24* (2013.01); *F16K 31/06* (2013.01); *F16K 51/00* (2013.01); *H01F 7/17* (2013.01); *H01F 7/13* (2013.01); *H01F 2007/085* (2013.01); *Y10T 137/8671* (2015.04)

(58) Field of Classification Search
CPC ...... H01F 7/13; H01F 2007/083; H01F 7/121; H01F 7/124; H01F 7/127; H01F 7/128; H01F 2007/086; H01F 2007/085; H01F 7/17; F16K 3/24–267; F16K 11/06–0716; F16K 11/0712; F16K 31/06; F16K 51/00; F16K 31/02–105; Y10T 137/8671
USPC ....... 335/248, 257, 273, 274, 277, 278, 286, 335/298, 281; 251/129.18; 137/625.64, 137/625.69
See application file for complete search history.

(56) References Cited

U.S. PATENT DOCUMENTS 3,529,620 A * 9/1970 Leiber ................. F16K 31/0631
137/269
4,154,198 A * 5/1979 Hoshi ..................... F02D 41/20
123/490
(Continued)

FOREIGN PATENT DOCUMENTS

JP 2015102150 6/2015

*Primary Examiner* — Craig J Price
(74) *Attorney, Agent, or Firm* — JCIPRNET

(57) ABSTRACT

A solenoid device includes a yoke, a core, a shaft, a bobbin, a coil, a plunger, a lid, and a housing. A housing body part of the housing has a first opening; a cylindrical first inner wall part having a first step part extending toward the outer side in the radial direction; and a cylindrical second inner wall part having a second step part extending toward the outer side in the radial direction. A first cylindrical part has a first flange part. The outer diameter of the first flange part is larger than the inner diameter of the first inner wall part and smaller than the inner diameter of the second inner wall part. A circumferential end part of the first flange part contacts the second step part. The lid is non-magnetic, and a circumferential edge part is held between the first step part and the first flange part.

8 Claims, 3 Drawing Sheets

(51) Int. Cl.
  *H01F 7/17* (2006.01)
  *F16K 51/00* (2006.01)
  *F16K 31/06* (2006.01)
  *F16K 3/24* (2006.01)
  *H01F 7/13* (2006.01)

(56) References Cited

U.S. PATENT DOCUMENTS

| | | | | |
|---|---|---|---|---|
| 4,404,533 A * | 9/1983 | Kurihara | ............... | H01H 51/065 |
| | | | | 335/126 |
| 4,649,844 A * | 3/1987 | Matsubara | ............. | D05B 45/00 |
| | | | | 112/270 |
| 4,921,208 A * | 5/1990 | LaMarca | ............. | F16K 31/0693 |
| | | | | 251/30.04 |
| 5,191,827 A * | 3/1993 | Kervagoret | ........... | B60T 8/3665 |
| | | | | 91/433 |
| 5,289,145 A * | 2/1994 | Schedele | ............. | H01H 50/026 |
| | | | | 335/128 |
| 5,460,146 A * | 10/1995 | Frankenberg | .......... | F02M 26/53 |
| | | | | 123/568.21 |
| 6,073,908 A * | 6/2000 | Koga | .................. | F16K 31/0655 |
| | | | | 251/129.15 |
| 6,293,296 B1 * | 9/2001 | Konishi | ............. | F02M 37/0052 |
| | | | | 123/514 |
| 6,378,557 B2 * | 4/2002 | Kawamura | ......... | F16H 61/0251 |
| | | | | 137/625.64 |
| 6,547,215 B2 * | 4/2003 | Matsusaka | .......... | F16K 31/0613 |
| | | | | 137/375 |
| 6,601,822 B2 * | 8/2003 | Tachibana | .......... | F16K 31/0613 |
| | | | | 137/625.69 |
| 6,681,806 B2 * | 1/2004 | Isobe | ........................ | F01L 1/34 |
| | | | | 137/625.65 |
| 6,834,844 B1 * | 12/2004 | Hamada | ................. | F02D 41/20 |
| | | | | 123/490 |
| 6,935,374 B2 * | 8/2005 | Yamamoto | ......... | G05D 16/2086 |
| | | | | 137/627.5 |
| 7,007,917 B2 * | 3/2006 | Choi | ................... | F16K 31/0655 |
| | | | | 251/122 |
| 7,159,615 B2 * | 1/2007 | Yamamoto | .......... | F16K 31/0624 |
| | | | | 137/596.17 |
| 7,195,027 B2 * | 3/2007 | Goossens | ................ | B60T 8/363 |
| | | | | 137/15.18 |
| 7,468,647 B2 * | 12/2008 | Ishibashi | ............. | F16K 31/0613 |
| | | | | 251/129.15 |
| 7,513,272 B2 * | 4/2009 | Segi | .................... | F16K 11/0708 |
| | | | | 137/625.65 |
| 8,082,953 B2 * | 12/2011 | Dayton | ............... | F16K 31/0613 |
| | | | | 137/625.65 |
| 8,154,370 B2 * | 4/2012 | Ishibashi | ................ | H01F 7/081 |
| | | | | 251/129.15 |
| 8,421,566 B2 * | 4/2013 | Sasao | ...................... | H01F 7/128 |
| | | | | 335/220 |
| 8,556,232 B2 * | 10/2013 | Oikawa | ............... | F16K 31/0613 |
| | | | | 251/129.01 |
| 8,707,994 B2 * | 4/2014 | Mizui | ................. | F15B 13/0402 |
| | | | | 137/625.25 |
| 8,800,961 B2 * | 8/2014 | Miura | .................. | F16K 17/196 |
| | | | | 251/129.15 |
| 8,925,585 B2 * | 1/2015 | Yasoshima | .......... | F16K 31/0613 |
| | | | | 137/625.65 |
| 8,931,758 B2 * | 1/2015 | Kasagi | ................ | F16K 31/0686 |
| | | | | 251/129.07 |
| 9,074,702 B2 * | 7/2015 | Morise | ................ | F16K 31/0686 |
| 9,303,535 B2 * | 4/2016 | Kira | ........................ | F16K 27/041 |
| 9,470,332 B2 * | 10/2016 | Miura | ................. | F16K 31/0696 |
| 9,601,252 B2 * | 3/2017 | Irie | ......................... | H01F 7/081 |
| 9,746,071 B2 * | 8/2017 | Schudt | ................ | F16H 61/0206 |
| 9,903,500 B2 * | 2/2018 | Fujita | .................... | F16K 31/082 |
| 10,371,278 B2 * | 8/2019 | Pellmann | .............. | H01F 7/1607 |
| 10,578,226 B2 * | 3/2020 | Jamison | ................ | F16K 27/029 |
| 2001/0009164 A1 * | 7/2001 | Motoki | .............. | G05D 16/2024 |
| | | | | 137/625.65 |
| 2005/0006611 A1 * | 1/2005 | Choi | ................... | F16K 31/0655 |
| | | | | 251/65 |
| 2006/0243938 A1 * | 11/2006 | Ishibashi | ............. | F16K 31/0613 |
| | | | | 251/129.15 |
| 2011/0148555 A1 * | 6/2011 | Sasao | ...................... | H01F 7/126 |
| | | | | 335/262 |
| 2012/0154079 A1 * | 6/2012 | Sasao | ...................... | H01F 7/128 |
| | | | | 335/278 |
| 2014/0225693 A1 * | 8/2014 | Ando | ................... | H01F 7/1607 |
| | | | | 335/281 |
| 2015/0129785 A1 * | 5/2015 | Kai | ..................... | F16K 31/0631 |
| | | | | 251/65 |
| 2015/0357107 A1 * | 12/2015 | Fochtman | ................ | H01F 7/13 |
| | | | | 417/53 |
| 2017/0130839 A1 * | 5/2017 | Takei | .................. | F16H 63/3425 |
| 2018/0180194 A1 * | 6/2018 | Lee | ..................... | F16H 61/0251 |
| 2019/0386542 A1 * | 12/2019 | Shiraki | .................... | H02K 9/20 |
| 2020/0041025 A1 * | 2/2020 | Murata | ................... | F16K 31/12 |

\* cited by examiner

SOLENOID DEVICE

CROSS-REFERENCE TO RELATED APPLICATION

This application claims the priority benefit of Japan Application No. 2018-122956, filed on Jun. 28, 2018. The entirety of the above-mentioned patent application is hereby incorporated by reference herein and made a part of this specification.

BACKGROUND

Technical Field

The disclosure relates to a solenoid device.

Description of Related Art

A solenoid valve, in which a spool valve is provided in a solenoid having a shaft, is known as an example of the solenoid device. The solenoid of the solenoid valve described in Patent Document 1 includes a cylindrical yoke extending in the axial direction; a cylindrical core positioned on the other side in the axial direction with respect to the yoke and extending in the axial direction; a shaft moving in the core in the axial direction; a bobbin disposed on the outer side of the yoke and the core in the radial direction; a coil wound on the bobbin; a plunger moving in the yoke in the axial direction; and a housing that houses these members. The spool valve is fixed to the housing via a caulking part that is provided at an end of the housing on the other side in the axial direction.

The housing of the solenoid described in Patent Document 1 is made of a magnetic material and has a bottomed cylindrical shape, which has a bottom on one side in the axial direction and is opened on the other side in the axial direction. Therefore, when the coil is energized, the plunger is drawn to the side of the core by the magnetic force generated in the coil. At this time, although the magnetic force lines passing through the plunger from the core return to the side of the coil via the yoke, part of the multiple magnetic force lines are led to the side of the coil via the yoke through the bottom of the housing. Thus, the magnetic circuit may disperse.

In addition, since part of the multiple magnetic force lines pass through the bottom of the housing and the housing is a magnetic material, the bottom of the housing is magnetized to attract the plunger. In order to suppress this attraction force, the bottom of the housing is provided with a protrusion that protrudes toward the side of the plunger. However, the position where the plunger is stopped by the protrusion on one side of the housing in the axial direction deviates toward the other side in the axial direction with respect to the inner bottom surface of the bottom of the housing. Therefore, in order to keep the stroke of the plunger at a constant value, it is necessary to increase the length of the housing in the axial direction.

RELATED ART

Patent Document

[Patent Document 1] Japanese Laid-Open No. 2015-102150

SUMMARY

The disclosure provides a solenoid device that can prevent increasing the size of the housing and suppress dispersion of the magnetic circuit.

A first exemplary embodiment of the disclosure is a solenoid device for moving a shaft in an axial direction with a magnetic force generated by excitation of a coil. The solenoid device includes: a yoke including a first cylindrical part that extends in the axial direction; a core positioned on the other side in the axial direction with respect to the yoke and including a second cylindrical part that extends in the axial direction; the shaft moving in the axial direction inside the second cylindrical part; a bobbin disposed on an outer side of the first cylindrical part and the second cylindrical part in a radial direction; the coil wound on the bobbin; a plunger moving in the axial direction inside the first cylindrical part; a lid positioned on one side in the axial direction with respect to the yoke and the plunger; and a housing housing the shaft, the yoke, the core, the bobbin, the coil, the plunger, and the lid. The housing includes a cylindrical housing body part, and the housing body part includes: a first opening that opens at an end on one side in the axial direction; a first inner wall part that includes an annular first step part, which extends toward the outer side in the radial direction, on an inner wall of the housing body part connected to the other side in the axial direction from the first opening and expands in a cylindrical shape in the axial direction; and a second inner wall part that includes an annular second step part, which extends toward the outer side in the radial direction, on the inner wall of the housing body part connected to the other side of the first inner wall part in the axial direction and expands in a cylindrical shape in the axial direction. The first cylindrical part of the yoke includes an annular first flange part that protrudes toward the outer side in the radial direction on one side of the first cylindrical part in the axial direction. An outer diameter of the first flange part is larger than an inner diameter of the first inner wall part and smaller than an inner diameter of the second inner wall part. An end surface of the first flange part on one side in the axial direction is in contact with the second step part. The lid is made of a non-magnetic material, and a surface on one side in the axial direction of a circumferential edge part on the outer side in the radial direction of the lid is in contact with the first step part, and a surface of the circumferential edge part on the other side in the axial direction is in contact with the end surface of the first flange part on one side in the axial direction, so that the circumferential edge part is fixed to the housing in a state of being held between the first step part and the end surface of the first flange part on one side in the axial direction.

EFFECTS

According to the first exemplary embodiment of the disclosure, it is possible to provide a solenoid device that can prevent increasing the size of the housing and suppress dispersion of the magnetic circuit.

DESCRIPTION OF THE EMBODIMENTS

Figure 1:
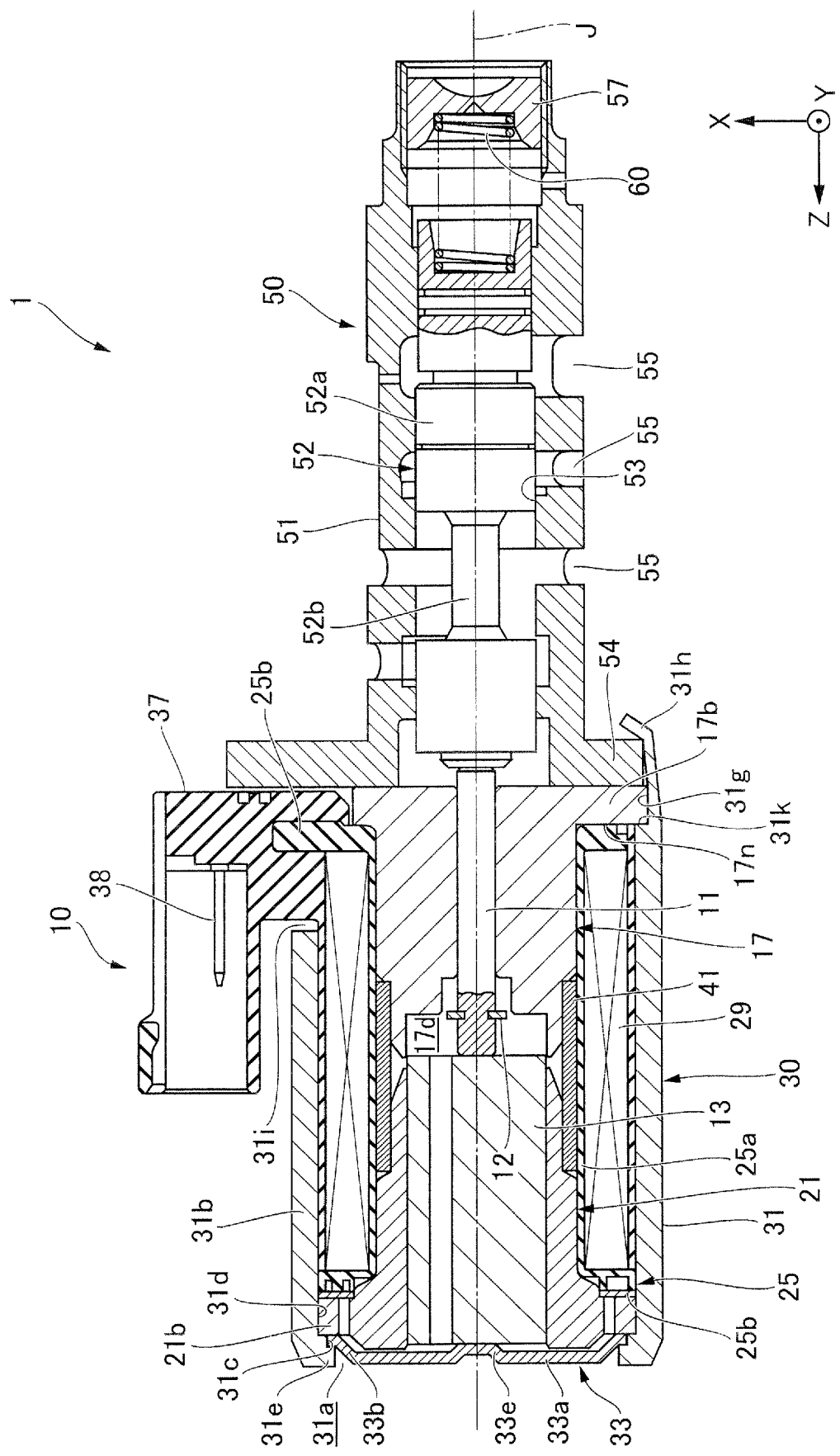
FIG. 1 is a cross-sectional view of the solenoid device according to the first embodiment.

Hereinafter, a solenoid device according to an embodiment of the disclosure will be described with reference to the drawings. The present embodiment illustrates a solenoid device, in which a spool valve for outputting pressure-regulated oil is provided in a solenoid. Moreover, in order to make each configuration easily understandable, in the following drawings, the scale, number, etc. of each structure may be different from the actual structure.

In the drawings, an XYZ coordinate system is shown as a three-dimensional orthogonal coordinate system as appropriate. In the XYZ coordinate system, the Z axis direction is set as a direction parallel to the axial direction of the central axis J shown in FIG. 1. The X axis direction is set as a direction parallel to the lateral direction of the solenoid device shown in FIG. 1. The Y axis direction is set as a direction orthogonal to both the X axis direction and the Z axis direction.

In the following descriptions, the positive side of the Z axis direction (+Z side) is referred to as the "rear side" and the negative side of the Z axis direction (−Z side) is referred to as the "front side". Nevertheless, the rear side and the front side are names used merely for explanation and are not intended to limit the actual positional relationship or direction. In addition, unless otherwise noted, the direction (Z axis direction) parallel to the central axis J is simply referred to as the "axial direction", the radial direction centered on the central axis J is simply referred to as the "radial direction", and the circumferential direction centered on the central axis J, that is, the direction (θ direction) around the central axis J is simply referred to as the "circumferential direction".

In this specification, extension in the axial direction includes not only extension strictly in the axial direction (Z axis direction) but also extension in a direction inclined within a range of less than 45° with respect to the axial direction. In addition, in this specification, extension in the radial direction includes not only extension strictly in the radial direction, that is, a direction perpendicular to the axial direction (Z axis direction) but also extension in a direction inclined within a range of less than 45° with respect to the radial direction.

First Embodiment

<Overall Configuration>

FIG. 1 is a cross-sectional view of a solenoid device according to the first embodiment. As shown in FIG. 1, the solenoid device 1 of the present embodiment includes a solenoid 10 and a spool valve 50. The solenoid 10 and the spool valve 50 are disposed along the axial direction. The solenoid 10 moves a shaft 11 in the axial direction with a magnetic force generated by excitation of a coil 29. The spool valve 50 is positioned on the other side (front side) of the solenoid 10 in the axial direction and includes a spool valve portion 52 that is movable in the axial direction along with movement of the shaft 11. The spool valve portion 52 is movably housed inside a valve body 51. Each component will be described in detail hereinafter. Applying a current to the coil 29 to generate magnetic flux is referred to as "excitation of the coil 29".

<Solenoid 10>

Figure 2:
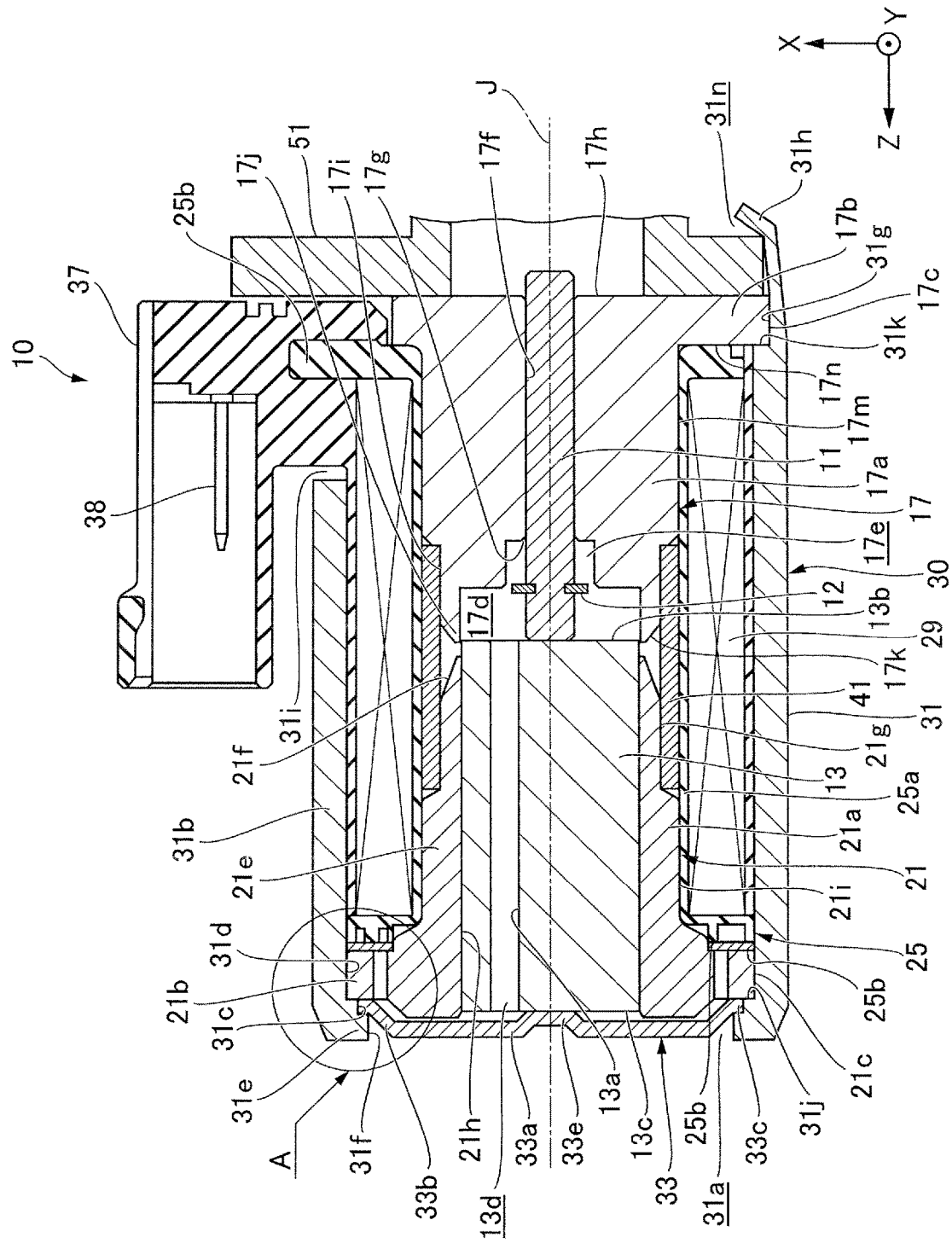
FIG. 2 is a cross-sectional view of the solenoid.
Figure 3:
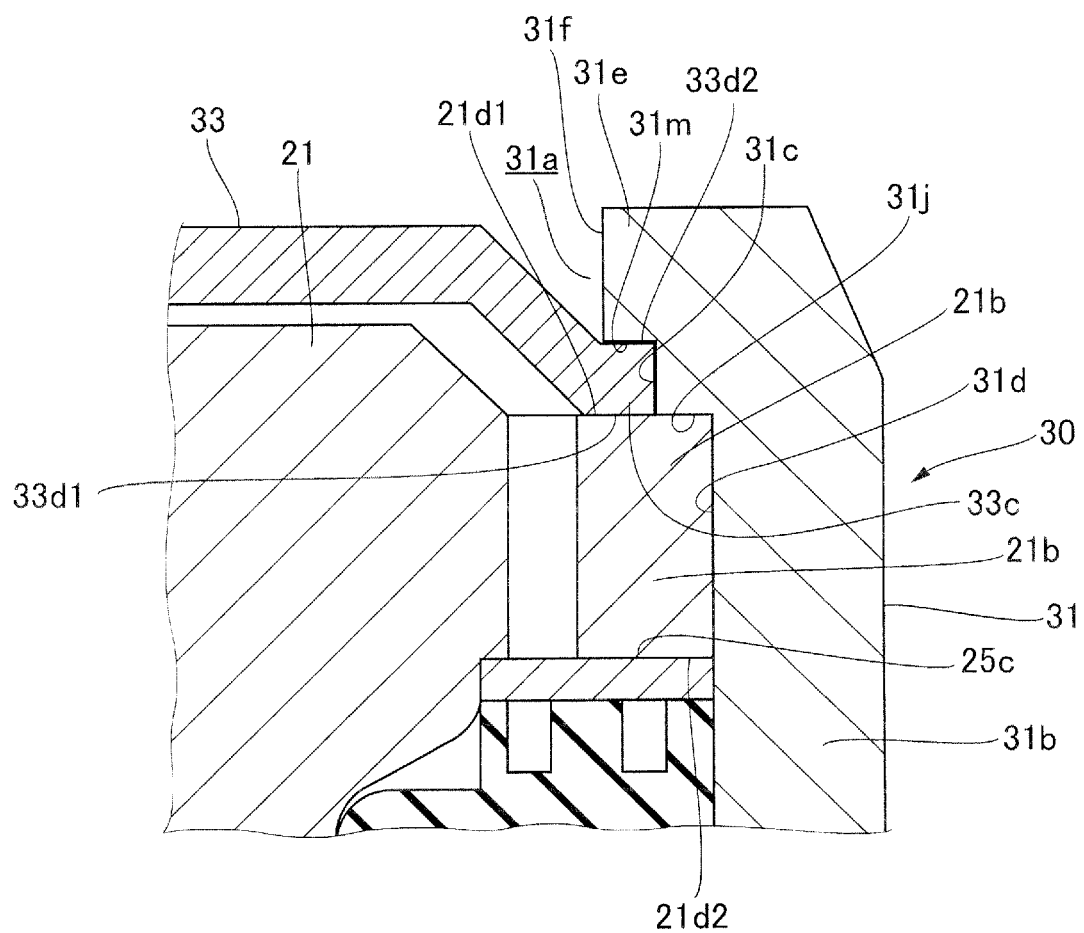
FIG. 3 is a partially enlarged view of a portion corresponding to the view indicated by the arrow A in FIG. 2.

FIG. 2 is a cross-sectional view of the solenoid. FIG. 3 is a partially enlarged view of a portion corresponding to the view indicated by the arrow A in FIG. 2. As shown in FIG. 2 and FIG. 3, the solenoid 10 includes a yoke 21, a core 17, the shaft 11, a bobbin 25, the coil 29, a plunger 13, a lid 33, and a housing 30.

(Housing 30)

The housing 30 is made of a magnetic metal material and houses the shaft 11, the yoke 21, the core 17, the bobbin 25, the coil 29, the plunger 13, and the lid 33. The housing 30 has a cylindrical housing body part 31. In the present embodiment, the housing body part 31 has a cylindrical shape. The housing body part 31 has a first opening 31a, a first inner wall part 31c, and a second inner wall part 31d. The first opening 31a opens at the end on one side in the axial portion. The first inner wall part 31c has an annular first step part 31m, which extends toward the outer side in the radial direction, on an inner wall 31b of the housing body part 31 connected to the other side in the axial direction from the first opening 31a and expands in a cylindrical shape in the axial direction. The second inner wall part 31d has an annular second step part 31j, which extends toward the outer side in the radial direction, on the inner wall 31b of the housing body part 31 connected to the other side of the first inner wall part 31c in the axial direction and expands in a cylindrical shape in the axial direction.

In the present embodiment, the end of the housing body part 31 on one side in the axial direction has an annular housing protrusion 31e that protrudes toward the inner side in the radial direction. The first inner wall part 31c is provided on the other side (front side) of the housing protrusion 31e in the axial direction. The first inner wall part 31c expands in the axial direction on the outer side in the radial direction from an end surface 31f of the housing protrusion 31e on the inner side in the radial direction to form a cylindrical shape. A surface of the first inner wall part 31c, which extends from the front side end of the first opening 31a toward the outer side in the radial direction, is the first step part 31m. Therefore, the first step part 31m is a surface orthogonal to the axial direction. The inner diameter of the first inner wall part 31c is smaller than the inner diameter of the inner wall 31b of the housing body part 31.

A surface of the second inner wall part 31d, which extends from the rear side end of the second inner wall part 31d toward the outer side in the radial direction, is the second step part 31j. Therefore, the second step part 31j is a surface orthogonal to the axial direction and is parallel to the first step part 31m. The inner diameter of the second inner wall part 31d is the same as the inner diameter of the inner wall 31b of the housing body part 31. Therefore, in the present embodiment, the inner surface of the second inner wall part 31d is flush with the inner surface of the inner wall 31b of the housing body part 31 on the other side in the axial direction (front side). The space surrounded by the end surface 31f of the housing protrusion 31e on the inner side in the radial direction forms the first opening 31a. A first flange part 21b of the yoke 21 is disposed opposite to the inner surface of the second inner wall part 31d.

As shown in FIG. 1 and FIG. 2, a third inner wall part 31g is provided on the inner wall 31b on the front side of the housing body part 31. The third inner wall part 31g has an annular third step part 31k, which extends toward the outer side in the radial direction, and expands in a cylindrical shape in the axial direction. The inner diameter of the third inner wall part 31g is larger than the inner diameter of the inner wall 31b of the housing body part 31. Therefore, the thickness of the third inner wall part 31g in the radial direction is smaller than the thickness of the inner wall 31b of the housing body part 31 in the radial direction.

The housing body part 31 has a caulking part 31h, which extends from the end on the front side of the third inner wall part 31g toward the front side. The thickness of the caulking part 31h in the radial direction is the same as the thickness of the third inner wall part 31g in the radial direction. Nevertheless, the thickness of the caulking part 31h in the radial direction may be smaller than the thickness of the third inner wall part 31g. By reducing the thickness of the caulking part 31h, plastic deformation of the caulking part 31h becomes easy and the workability of the caulking operation can be improved. The valve body 51 of the spool valve 50 is fixed to the housing 30 by the caulking part 31h.

A terminal cutout part 31i is provided at an end on the plus side in the X axis direction on the front side of the housing body part 31. A terminal body part 37 that holds a terminal 38 electrically connected to the coil 29 protrudes from the inner side of the terminal cutout part 31i in the radial direction toward the outer side. The terminal body part 37 and the bobbin 25 on which the coil 29 is wound are an integrally formed product.

(Yoke 21)

The yoke 21 is positioned on one side in the axial direction (rear side) inside the housing body part 31 and has a first cylindrical part 21a that extends in the axial direction. In the present embodiment, the first cylindrical part 21a has a first through hole 21h that penetrates in the axial direction. The plunger 13 is inserted into the first through hole 21h.

The annular first flange part 21b that protrudes toward the outer side in the radial direction is provided on one side (rear side) of the first cylindrical part 21a in the axial direction. The outer diameter of the first flange part 21b is larger than the inner diameter of the first inner wall part 31c and smaller than the inner diameter of the second inner wall part 31d. Therefore, the first flange part 21b can be easily inserted into the second inner wall part 31d.

In the present embodiment, the first flange part 21b has an annular shape, and the thickness of the first flange part 21b in the axial direction is approximately the same as the thickness of the inner wall 31b of the housing body part 31. Therefore, a circumferential end part 21c of the first flange part 21b is disposed along the inner surface of the second inner wall part 31d. Thus, the yoke 21 can be disposed inside the housing body part 31 in a posture along the central axis J.

As shown in FIG. 3, the first flange part 21b of the yoke 21 is fixed to the housing 30 in a state of being held between the end surface 25c of the bobbin 25 on one side in the axial direction and the first step part 31m. A circumferential edge part 33c of the lid 33 is in contact with an end surface 21d1 of the first flange part 21b in addition to the second step part 31j.

As shown in FIG. 2, the length of the first cylindrical part 21a in the axial direction is substantially the same as the length of the plunger 13 in the axial direction. The inner diameter of the first through hole 21h of the first cylindrical part 21a is slightly larger than the outer diameter of the plunger 13. Therefore, the first cylindrical part 21a functions as a slide bearing that supports the plunger 13, and allows the plunger 13 to move in the axial direction.

An end of a wall part 21e of the first cylindrical part 21a on the other side in the axial direction (front side) has an inclined surface part 21f that is inclined obliquely toward the inner side in the radial direction as it goes toward the other side in the axial direction. In addition, a cylindrical first fitting part 21g that has a smaller diameter than the wall part 21e is provided on the wall part 21e of the first cylindrical part 21a on the other side in the axial direction. A collar 41 (will be described later) is attached to the first fitting part 21g.

The first cylindrical part 21a and the first flange part 21b of the yoke 21 are integrally formed. That is, the first cylindrical part 21a and the first flange part 21b are made of a single member. The yoke 21 is obtained by die molding or cutting. Nevertheless, the first cylindrical part 21a and the first flange part 21b of the yoke 21 may be separate members.

(Plunger 13)

The plunger 13 moves in the axial direction inside the first cylindrical part 21a. In the present embodiment, the plunger 13 is made of a magnetic material and has a columnar shape. The outer diameter of the plunger 13 is slightly smaller than the inner diameter of the first through hole 21h of the first cylindrical part 21a.

The plunger 13 has a second through hole 13a that penetrates in the axial direction. In the present embodiment, the front side of the second through hole 13a opens on the plunger end surface 13b on the front side of the plunger 13 and the rear side opens on the plunger end surface 13c on the rear side of the plunger 13. The second through hole 13a is positioned on the outer side in the radial direction with respect to the shaft 11, as viewed in the axial direction.

(Core 17)

The core 17 is positioned on the other side in the axial direction (front side) with respect to the yoke 21 and has a second cylindrical part 17a that extends in the axial direction. The second cylindrical part 17a has a third through hole 17f that extends in the axial direction for inserting the shaft 11 therein. In the present embodiment, the core 17 is made of a magnetic material and is disposed on the front side of the housing 30 and fixed inside the housing 30. The core 17 is coupled to the yoke 21 via the collar 41 and fixed to the housing 30 in a state of being in contact with the inner surface of the bobbin 25. An annular second flange part 17b that protrudes in the radial direction is provided on the front side of the second cylindrical part 17a of the core 17. The outer diameter of the second flange part 17b is slightly smaller than the inner diameter of the third inner wall part 31g.

An end surface 17n of the second flange part 17b on one side in the axial direction is in contact with the third step part 31k. Therefore, the core 17 is positioned on one side in the axial direction (rear side) with respect to the housing 30.

A first space 17d, which opens on the rear side and is recessed toward the front side, is provided on the rear side of the second cylindrical part 17a. In the present embodiment, the first space 17d is provided coaxially with the central axis J and has a circular shape, as viewed in the axial direction. The inner diameter of the first space 17d is slightly larger than the outer diameter of the plunger 13. Therefore, the plunger 13 is movable in the axial direction inside the first space 17d.

The first space 17d is provided with an extended space 17e that extends from the front side end of the first space 17d toward the front side. The extended space 17e opens on the rear side and extends toward the front side. The inner diameter of the extended space 17e is smaller than the inner diameter of the first space 17d. An opening 17g on the rear side of the third through hole 17f, through which the shaft 11 passes, opens on the bottom surface on the front side of the extended space 17e.

The rear side of the third through hole 17f opens to the extended space 17e and the front side opens on the end surface 17h on the front side of the second cylindrical part 17a. The shaft 11 movably passes through the third through hole 17f. The third through hole 17f functions as a slide bearing that supports the shaft 11, and allows the shaft 11 to move in the axial direction.

A cylindrical second fitting part 17i, which has a diameter smaller than that on the front side of the second cylindrical part 17a, is provided on the rear side of the second cylindrical part 17a. The front side of the collar 41 is fitted to the second fitting part 17i. The rear side of the collar 41 is fitted to the first fitting part 21g of the yoke 21. Therefore, the yoke 21 and the core 17 are coupled via the collar 41.

A cylindrical thin wall part 17j that extends toward the rear side is provided on the outer side of the first space 17d of the second cylindrical part 17a in the radial direction. The thin wall part 17j has an inclined surface part 17k that is inclined toward the inner side in the radial direction as it goes toward one side in the axial direction. The thin wall part 17j having the inclined surface part 17k concentrates the magnetic force lines that extend from the thin wall part 17j toward the side of the plunger 13 and increases the force of pulling the plunger 13 toward the front side when the coil 29 is energized.

(Shaft 11)

As shown in FIG. 2, the shaft 11 moves in the axial direction with respect to the second cylindrical part 17a. In the present embodiment, the shaft 11 is made of a non-magnetic metal material, and the outer diameter of the shaft 11 is slightly smaller than the inner diameter of the third through hole 17f. An end on the rear side of the shaft 11 protrudes into the first space 17d, and an end on the front side of the shaft 11 protrudes from the end surface 17h on the front side of the core 17. A retaining ring 12 is attached to the rear side of the shaft 11.

When the plunger 13 moves the shaft 11 toward the front side, before the plunger end surface 13b on the front side of the plunger 13 comes into contact with the bottom surface of the first space 17d, the retaining ring 12 is at a position in contact with the bottom surface of the extended space 17e. Therefore, when the shaft 11 moves toward the front side, the plunger 13 can be prevented from coming into contact with the bottom surface of the first space 17d.

(Bobbin 25)

The bobbin 25 has a cylindrical shape and is disposed on the outer side of the first cylindrical part 21a and the second cylindrical part 17a in the radial direction. In the present embodiment, the bobbin 25 is made of resin and covers a side surface 21i of the first cylindrical part 21a on the outer side in the radial direction and a side surface 17m of the second cylindrical part 17a on the outer side in the radial direction. The bobbin 25 has a cylindrical part 25a, and a third flange part 25b that is provided on two sides of the cylindrical part 25a in the axial direction and protrudes toward the outer side in the radial direction. The coil 29 is wound on the cylindrical part 25a.

The third flange part 25b on the plus side in the X axis direction is connected to the terminal body part 37 that extends toward the outer side in the radial direction. The bobbin 25 with the coil 29 wound thereon is integrally molded of resin together with the terminal body part 37.

(Coil 29)

The coil 29 is wound on the bobbin 25. In the present embodiment, the coil 29 is wound in the circumferential direction along the outer circumferential surface of the cylindrical part 25a of the bobbin 25 on the outer side in the radial direction. Two ends of the coil 29 are electrically connected to the terminal 38 provided in the terminal body part 37.

(Lid 33)

As shown in FIG. 2, the lid 33 is made of a non-magnetic material and is positioned on one side in the axial direction (rear side) with respect to the yoke 21 and the plunger 13. The lid 33 has a lid body part 33a disposed opposite to the plunger end surface 13c of the plunger 13 on one side in the axial direction; an annular inclined part 33b extending from the end of the lid body part 33a on the outer side in the radial direction toward the outer side in the radial direction as it goes toward the other side in the axial direction; and an annular circumferential edge part 33c protruding from the end of the inclined part 33b on the outer side in the radial direction toward the outer side in the radial direction.

The lid 33 as shown in FIG. 2 and FIG. 3, a surface 33d2 on one side in the axial direction of the circumferential edge part 33c on the outer side in the radial direction of the lid 33 is in contact with the first step part 31m, and a surface 33d1 of the circumferential edge part 33c on the other side in the axial direction is in contact with the end surface 21d1 of the first flange part 21b on one side in the axial direction, so that the circumferential edge part 33c is fixed to the housing 30 in a state of being held between the first step part 31m and the end surface 21d1 of the first flange part 21b on one side in the axial direction. In the state where the lid 33 is fixed to the housing 30, the lid 33 closes the first opening 31a. In the present embodiment, the first opening 31a is covered by the lid body part 33a and the inclined part 33b of the lid 33.

The thickness of the circumferential edge part 33c of the lid 33 in the axial direction is larger than the length of the first inner wall part 31c in the axial direction. Therefore, in the state where the circumferential edge part 33c is in contact with the first step part 31m, the surface 33d1 on the front side of the circumferential edge part 33c can be brought into contact with the end surface 21d1 of the first flange part 21b on one side in the axial direction.

The lid body part 33a is disposed in the region of the first opening 31a in the axial direction. Therefore, the lid body part 33a does not protrude from the end on the rear side of the housing body part 31 in the axial direction.

The lid body part 33a has a protrusion 33e that protrudes toward the side of the plunger on the inner side of the lid body part 33a in the radial direction. In the embodiment, the protrusion 33e is in contact with the central part of the plunger end surface 13c on the rear side of the plunger 13 and is disposed at a position that deviates toward the side of the central axis J with respect to the opening 13d on the rear side of the second through hole 13a.

<Spool Valve 50>

(Valve Body 51)

As shown in FIG. 1, the valve body 51 has a cylindrical shape and has a plurality of ports 55 through which oil flows in or out. The valve body 51 has a spool hole 53 that extends in the axial direction for inserting the spool valve portion 52. The spool hole 53 penetrates the valve body 51 in the axial direction. A plurality of ports 55 are connected to the spool hole 53. A flange part 54 that protrudes in the radial direction is provided at the rear side end of the valve body 51. The flange part 54 is caulked by the caulking part 31h provided on the housing body part 31 of the solenoid 10 to be fixed to the housing body part 31.

(Spool Valve Portion 52)

The spool valve portion 52 includes a plurality of large diameter parts 52a each having an outer diameter slightly smaller than the inner diameter of the spool hole 53, and a small diameter part 52b that connects the large diameter parts 52a adjacent to each other in the axial direction and has a smaller diameter than the large diameter parts 52a. By moving the spool valve portion 52 in the axial direction, the large diameter parts 52a open and close the ports 55. A closing member 57 for closing the opening on the front side of the spool hole 53 is inserted into the end on the front side of the valve body 51. A compression spring 60 is disposed between the closing member 57 and the front side end of the spool valve portion 52. Therefore, the spool valve portion 52 is urged toward the rear side by the compression spring 60.

<Method of Assembling the Solenoid 10>

First, as shown in FIG. 2, the lid 33 is inserted into the housing body part 31 from the second opening 31n that opens on the front side of the housing body part 31 with the protrusion 33e facing the front side. The lid 33 is disposed inside the housing body part 31 in a state where the surface 33d2 on the rear side of the circumferential edge part 33c is in contact with the first step part 31m. After the lid 33 is disposed, the yoke 21 is inserted into the housing body part 31 from the second opening 31n with the first flange part 21b facing the rear side, so as to bring the end surface 21d1 of the first flange part 21b on one side in the axial direction into contact with the surface 33d1 on the front side of the circumferential edge part 33c of the lid 33.

After the yoke 21 is disposed, an assembly obtained by integrating the bobbin 25 and the terminal body part 37 is inserted into the housing body part 31 from the second opening 31n of the housing body part 31. The bobbin 25 is fixed by fitting the outer circumferential surface of the bobbin 25 to the inner surface of the inner wall 31b of the housing body part 31. In addition, the outer circumferential surface of the first cylindrical part 21a of the yoke 21 is in contact with the inner circumferential surface of the bobbin 25.

After the assembly is inserted, the plunger 13 is inserted into the housing body part 31 from the second opening 31n, and the plunger 13 is inserted into the first through hole 21h of the first cylindrical part 21a of the yoke 21. After the plunger 13 is inserted, the collar 41 is inserted into the housing body part 31 from the second opening 31n and fitted to the first fitting part 21g of the yoke 21. After the collar 41 is inserted, the core 17 with the shaft 11 inserted therein is inserted into the housing body part 31 from the second opening 31n with the first space 17d facing the rear side, and the collar 41 that extends from the yoke 21 toward the front side is fitted to the second fitting part 17i of the core 17, so as to complete the assembly of the solenoid 10.

Nevertheless, the assembling method of the solenoid 10 is not limited to the order described above. In the assembling method described above, the assembly is inserted into the housing body part 31 after the yoke 21 is disposed. However, the plunger 13 may be inserted into the yoke 21 after the yoke 21 is disposed.

<Operation and Effect of the Solenoid Device 1>

Next, the operation and effect of the solenoid device 1 will be described. As shown in FIG. 1, when the coil 29 of the solenoid 10 of the solenoid device 1 is excited, the plunger 13 is attracted toward the side of the core 17 by the magnetic force generated in the coil 29. Therefore, the shaft 11 in contact with the plunger 13 moves toward the front side together with the plunger 13. In addition, when the shaft 11 moves, it moves against the urge of the compression spring 60. Thus, the spool valve portion 52 in contact with the shaft 11 moves toward the front side.

On the other hand, when the coil 29 of the solenoid 10 is in the non-excitation state, the plunger 13 loses the attraction force from the core 17. Therefore, the spool valve portion 52 is moved toward the rear side by the urging force of the compression spring 60 that is directed to the front side. In addition, along with the movement of the spool valve portion 52 toward the rear side, the shaft 11 and the plunger 13 of the solenoid 10 move toward the rear side.

(1) Here, the lid 33 of the solenoid device 1 according to the present embodiment is made of a non-magnetic material, and as shown in FIG. 2 and FIG. 3, the end surface 21d1 of the first flange part 21b on one side in the axial direction is in contact with the second step part 31j, and the circumferential edge part 33c of the lid 33 is held between the first step part 31m and the end surface 21d1 of the first flange part 21b on one side in the axial direction, by which the lid 33 is fixed to the housing 30. Therefore, the lid 33 is firmly fixed in the axial direction. Moreover, the magnetic force lines that return to the coil 29 through the yoke 21 from the plunger 13 are unlikely to pass through the lid 33. In addition, if the magnetic force lines that come out of the coil 29 pass through the inside of the housing 30 via the first flange part 21b, since the first flange part 21b is in contact with the housing 30 via the second step part 31j, transmission of the magnetic force lines from the first flange part 21b to the housing 30 is facilitated. Therefore, it is possible to suppress dispersion of the magnetic circuit in the solenoid device 1, and prevent the attraction force of the plunger 13 for the core 17 from dropping.

(2) Further, the first flange part 21b of the yoke 21 is fixed to the housing 30 in a state of being held between the end surface 25c of the bobbin 25 on one side in the axial direction and the second step part 31j. Therefore, the yoke 21 can be firmly fixed to the housing 30 in the axial direction.

(3) Also, the lid 33 closes the first opening 31a in a state of being fixed to the housing 30. Therefore, the magnetic force lines passing through the plunger 13 or the yoke 21 can be prevented from leaking to the outside from the first opening 31a.

(4) In addition, the first cylindrical part 21a and the first flange part 21b of the yoke 21 are integrated. Therefore, the number of parts can be reduced as compared with the case where the first cylindrical part 21a and the first flange part 21b of the yoke 21 are separate members.

(5) Furthermore, the lid 33 has the lid body part 33a disposed opposite to the plunger end surface 13c on the rear side of the plunger 13; the annular inclined part 33b extending from the end of the lid body part 33a on the outer side in the radial direction toward the outer side in the radial direction as it goes toward the other side in the axial direction; and the annular circumferential edge part 33c protruding from the end of the inclined part 33b on the outer side in the radial direction toward the outer side in the radial direction. Therefore, the lid body part 33a can be positioned on one side in the axial direction with respect to the circumferential edge part 33c. Thus, the plunger 13 can be disposed close to the side of the lid body part 33a, and the size of the solenoid device 1 in the axial direction can be prevented from increasing.

(6) Moreover, the thickness of the circumferential edge part 33c in the axial direction is larger than the length of the first inner wall part 31c in the axial direction. Therefore, the surface 33d1 of the circumferential edge part 33c on the other side in the axial direction can be reliably brought into contact with the end surface 21d of the first flange part 21b on one side in the axial direction.

(7) Further, the lid body part 33a has the protrusion 33e that protrudes toward the side of the plunger 13 on the inner side of the lid body part 33a in the radial direction. Therefore, when the plunger 13 moves toward one side in the axial direction, the plunger end surface 13c of the plunger 13 on one side in the axial direction can come into contact with the protrusion 33e to restrict movement of the plunger 13 toward one side in the axial direction.

(8) In addition, the lid body part 33a is disposed in the region of the first opening 31a in the axial direction. Therefore, the size of the solenoid device 1 in the axial direction can be prevented from increasing as compared with the case where the lid body part 33a is disposed on the other side in the axial direction with respect to the first opening 31a.

Although exemplary embodiments of the disclosure have been described above, the disclosure is not limited to these embodiments, and it is possible to make various modifications and changes within the scope of the disclosure. These embodiments and modifications thereof are included in the scope of the disclosure as well as in the scope of the disclosure defined in the claims and its equivalent.

What is claimed is:

1. A solenoid device for moving a shaft in an axial direction with a magnetic force generated by excitation of a coil, the solenoid device comprising:
    a yoke comprising a first cylindrical part that extends in the axial direction;
    a core positioned on the other side in the axial direction with respect to the yoke and comprising a second cylindrical part that extends in the axial direction;
    the shaft moving in the axial direction inside the second cylindrical part;
    a bobbin disposed on an outer side of the first cylindrical part and the second cylindrical part in a radial direction;
    the coil wound on the bobbin;
    a plunger moving in the axial direction inside the first cylindrical part;
    a lid positioned on one side in the axial direction with respect to the yoke and the plunger; and
    a housing housing the shaft, the yoke, the core, the bobbin, the coil, the plunger, and the lid,
    wherein the housing comprises a cylindrical housing body part, and
    the housing body part comprises:
    a first opening that opens at an end on one side in the axial direction;
    a first inner wall part that comprises an annular first step part, which extends toward the outer side in the radial direction, on an inner wall of the housing body part connected to the other side in the axial direction from the first opening and expands in a cylindrical shape in the axial direction; and
    a second inner wall part that comprises an annular second step part, which extends toward the outer side in the radial direction, on the inner wall of the housing body part connected to the other side of the first inner wall part in the axial direction and expands in a cylindrical shape in the axial direction,
    wherein the first cylindrical part of the yoke comprises an annular first flange part that protrudes toward the outer side in the radial direction on one side of the first cylindrical part in the axial direction,
    an outer diameter of the first flange part is larger than an inner diameter of the first inner wall part and smaller than an inner diameter of the second inner wall part,
    an end surface of the first flange part on one side in the axial direction is in contact with the second step part,
    the lid is made of a non-magnetic material, and
    a surface on one side in the axial direction of a circumferential edge part on the outer side in the radial direction of the lid is in contact with the first step part, and a surface of the circumferential edge part on the other side in the axial direction is in contact with the end surface of the first flange part on one side in the axial direction, so that the circumferential edge part is fixed to the housing in a state of being held between the first step part and the end surface of the first flange part on one side in the axial direction.

2. The solenoid device according to claim 1, wherein the bobbin has a cylindrical shape, and
    the first flange part of the yoke is fixed to the housing in a state of being held between an end surface of the bobbin on one side in the axial direction and the second step part.

3. The solenoid device according to claim 1, wherein the lid closes the first opening in a state of being fixed to the housing.

4. The solenoid device according to claim 1, wherein the first cylindrical part and the first flange part of the yoke are integrated.

5. The solenoid device according to claim 1, wherein the lid comprises:
    a lid body part disposed opposite to a plunger end surface of the plunger on one side in the axial direction;
    an annular inclined part extending from an end of the lid body part on the outer side in the radial direction toward the outer side in the radial direction as the inclined part goes toward the other side in the axial direction; and
    the annular circumferential edge part protruding from an end of the inclined part on the outer side in the radial direction toward the outer side in the radial direction.

6. The solenoid device according to claim 5, wherein a thickness of the circumferential edge part in the axial direction is larger than a length of the first inner wall part in the axial direction.

7. The solenoid device according to claim 5, wherein the lid body part comprises a protrusion that protrudes toward the side of the plunger on an inner side of the lid body part in the radial direction.

8. The solenoid device according to claim 5, wherein the lid body part is disposed in a region of the first opening in the axial direction.

* * * * *